Oct. 4, 1966  N. J. PINNEY  3,276,608
BALE LIFTING MEANS AND METHOD
Filed Sept. 23, 1964
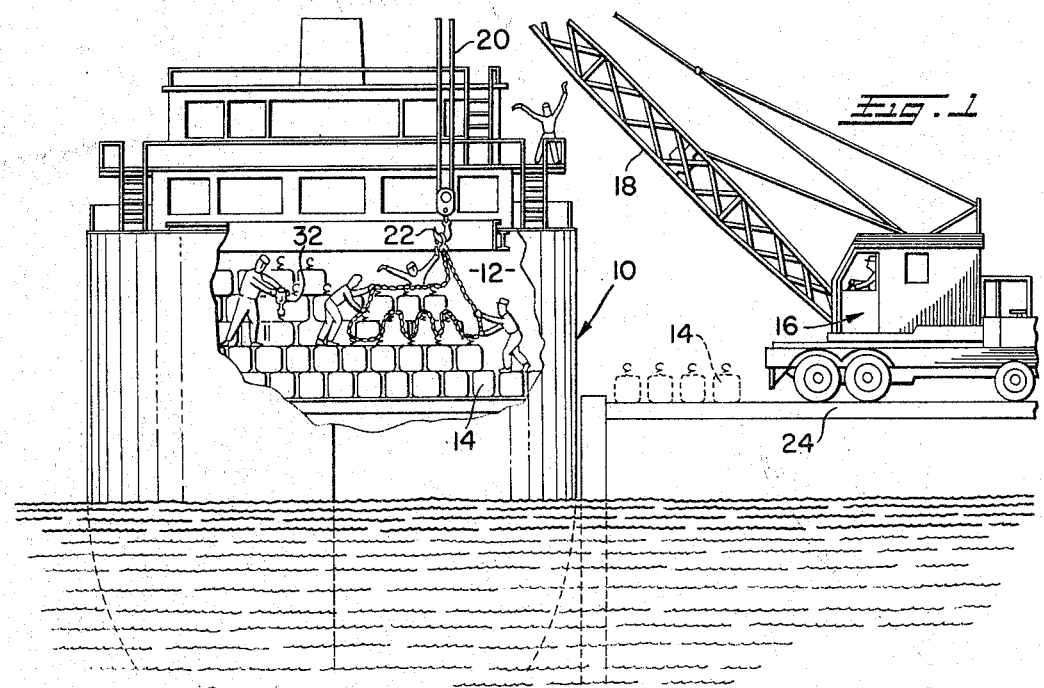
Fig. 1
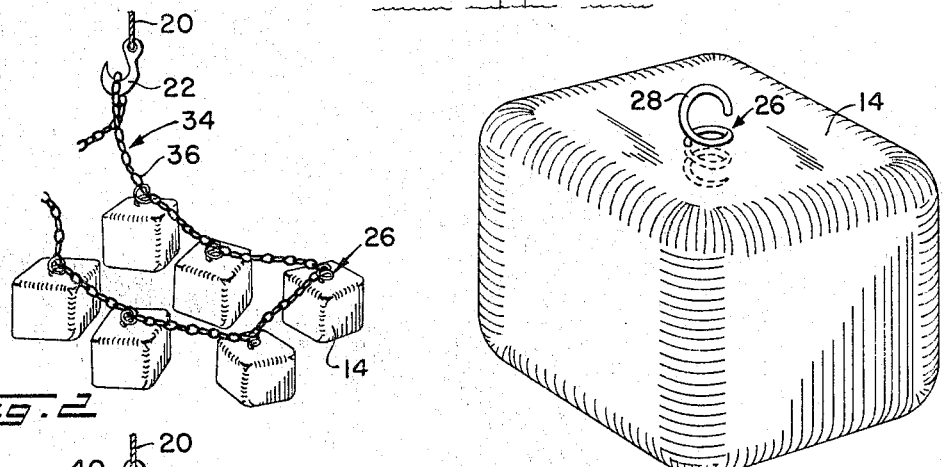
Fig. 2
Fig. 3
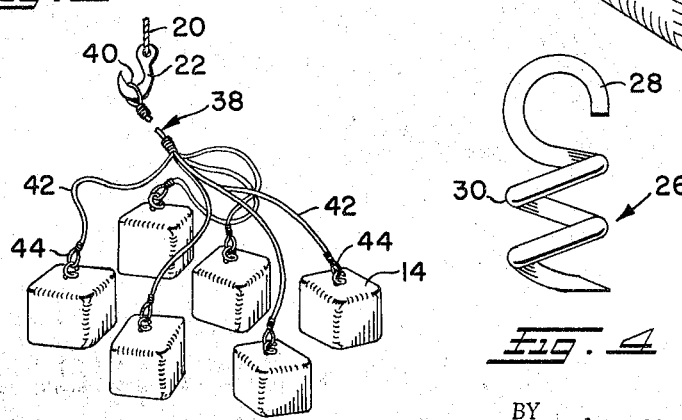
Fig. 4
Fig. 5
INVENTOR
NELSON J. PINNEY
BY Oberlin, Maky & Donnelly
ATTORNEYS

United States Patent Office 3,276,608
Patented Oct. 4, 1966

3,276,608
BALE LIFTING MEANS AND METHOD
Nelson J. Pinney, Ashtabula, Ohio, assignor to Pinney Dock & Transport Company, Ashtabula, Ohio, a corporation of Ohio
Filed Sept. 23, 1964, Ser. No. 398,536
5 Claims. (Cl. 214—14)

The present invention relates as indicated to a bale lifting means and transport system and more particularly to a novel system for lifting at one time a plurality of bales of crude rubber or similar material for movement from the hold of a ship, e.g., to a place of deposit adjacent such ship.

Present methods of lifting bales of rubber or the like from the holds of ships are less than satisfactory for a number of reasons. In perhaps the most common method, a cargo net is lowered into the hold, and the bales are lifted or otherwise manipulated into the net, with the top of the net then gathered for attachment to the cable hook of a lifting crane or like lifting means. Each individual bale is approximately 20 inches square and weighs in the neighborhood of 200 pounds, and thus normally requires two men to lift the same into the net. Secondly, owing to the resilience and bounciness of the crude rubber bales, the loading of the bales into the net, if the bales are rolled rather than lifted, can be a very time-consuming and unsatisfactory experience. These same general disadvantages attend the unloading of the bales at the place of deposit.

An object of the present invention is to provide a completely new concept for lifting and transferring a plurality of bales of rubber or the like and in a much easier and more expeditious manner.

A more specific object of the present invention is to provide a novel bale lifting means which can be quickly removably inserted into each rubber bale to prepare the same for ready attachment to means in turn associated with a suitable source of power whereby a plurality of such bales can be moved at one time, with such bale lifting means being thereafter simply and quickly removed from the bale subsequent to the transferring movement.

A further object of the present invention is to provide a bale lifting means and system in which the bales are picked up successively thereby avoiding instantaneous maximum loading of the lifting crane.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is an elevational view of a ship, partially broken away to illustrate a hold thereof in which the rubber bales are stored, showing generally diagrammatically the means for and method of lifting a group of such rubber bales from the hold to the adjoining dock platform;

FIG. 2 is a fragmentary perspective view showing more clearly the preferred arrangement for removably attaching a plurality of hook-containing bales to the links of a chain for movement of the bales from the ship's hold;

FIG. 3 is an enlarged perspective view of an individual rubber bale with the screw hook removably inserted therein;

FIG. 4 is a perspective view of the screw hook per se, and

FIG. 5 is a fragmentary perspective view showing an alternative arrangement for releasably attaching a plurality of bales for lifting movement from the hold.

Referring now in more detail to the drawing, wherein like reference numerals are employed to designate like parts, a ship generally indicated at 10 is provided with a plurality of hold spaces 12, only one of which is shown in FIG. 1, in which cargo can be stored in the usual manner. The cargo in the form shown comprises a plurality of rubber bales commonly designated at 14 which are disposed, preferably with some arrangement, in the hold. The construction of the ship and the hold form no part of the present invention and description thereof is not believed necessary for a full understanding of the present invention.

A crane generally indicated at 16 similarly of conventional construction is provided having a boom section 18 and a cable 20 associated therewith with the latter having attached at the bottom thereof a hook 22 which can be lowered into the hold 12 of the ship. A plurality or group of such bales are lifted by the crane 16, through the cable and hook, to a dock platform 24 in a manner to be presently described.

In accordance with the present invention a screw hook generally indicated at 26 is removably inserted in each rubber bale 14 in a manner indicated in FIG. 3, thus to leave an exposed hook portion 28 by means of which a bale can be suspended or attached to a suitable lifting means. The pitch of the helical screwlike bottom portion 30 of the preferably metal screw hook 26 is relatively great thereby to enhance the retention of the screw hook in the bale and to prevent inadvertent and premature withdrawal thereof. Although it will be understood that the screw hook 26 can be inserted into the bale in any suitable manner, such insertion and removal is preferably accomplished in the present invention by means of a power tool 32, FIG. 1, having a chuck portion constructed to grip the hook portion of the screw hook for rapidly driving the same into the bale the desired depth. Such tool is also employed to remove the screw hook from the bale at the termination of the handling operation.

Referring to FIG. 2, one means for lifting a plurality of bales 14 having screw hooks 26 attached thereto comprises a chain generally indicated at 34 having the usual individual links 36, which chain can be lowered into the hold 12 by the cable 20 and allowed to go slack to facilitate insertion of the screw hooks through the link openings. A relatively large group of such bales 14, e.g. approximately ten to twelve, can be similarly suspended on the chain 34 for lifting at one time. The chain 34 can be attached to the hook 22 in any suitable manner.

There is illustrated in FIG. 5 a slightly different arrangement for simultaneously lifting the bales by the crane cable 20 and hook 22. In this form a cable generally indicated at 38 is provided with an upper looped end portion 40 adapted to be hooked over the hook 22. The cable 38 is shown broken in FIG. 5 and can be of any suitable length to provide optimum handling of the bales. Secured to the opposite end of the cable 38 by any suitable means is a plurality of shorter cables commonly designated at 42, each of which is formed at its free end with a loop 44. The loop 44 provides an opening through which the hook 28 of the screw hook 26 can be inserted for lifting each bale. The shorter cables may be of somewhat different lengths to obtain a better cluster of bales for hoisting.

The normal bale lifting operation is as follows. A group of workmen enter the hold 12 of the ship with a supply of screw hooks 26 and one or more power tools 32 for driving the screw hooks 26 into the bales 14. The crane operator then lowers the cable 20 and hook 22 into the hold of the ship together with the chain 34 or the cables 38 and 42, whichever the case may be. Assuming the chain 34 is employed, the chain 34 is allowed to go slack and a plurality of bales, by means of the screw hooks 26, are hooked thereto. As noted, the chain 34 is preferably of a length to accommodate approximately ten to twelve such bales for each lifting operation. After the bales have been hooked to the chain 34, the cable 20 is raised by the crane operator and the chain 34 is correspondingly raised with the bales suspended therefrom. It will be noted that the bales 14 are thus picked up successively as the chain 34 is raised thereby avoiding a sudden maximum loading on the cable 20 and the crane boom 18.

The cable 20 is then swung by the boom 18 of the crane above the dock platform 24, with the cable 20 being thereafter lowered and the chain 34 allowed to go slack. The individual bales 14 are then removed from the chain 34 by disengaging the chain links from the hook ends 28 of the screw hooks thereby freeing the bales 14 for subsequent handling. Although the bales 14 are shown being unloaded on the dock platform 24, it will be understood that the same could be swung to and directly unloaded in a railroad car, for example, or similar haulage equipment. The screw hooks 26 may then be removed from the bales or remain imbedded therein if the latter such condition would enhance the subsequent handling operations. When removed, the screw hooks 26 can be returned to the hold for reuse.

The lifting operation when the cables 38 and 42 are employed, as illustrated in FIG. 5, is generally similar to that described above. After the cable 20 and hook 22 have been lowered into the hold along with the cables, the looped ends 44 of the the individual cables are manipulated around the hook ends 28 of the screw hooks 26. Again, preferably ten to twelve such cables 42 are provided to lift at one time the corresponding number of bales 14. The cable 20 is then raised by the crane boom 18 with the bales 14 being lifted by the cables 42. When the cable 20 has been lifted and swung over the dock platform 24, the same is lowered and the cables 42 are allowed to go slack thereby to permit detachment of the loops 44 of the cables from the hook ends 28 of the screw hooks 26.

It will thus be seen that the present invention provides a novel bale lifting means and transport system having significant advantages over present methods of bale handling. The screw hooks can be quickly inserted in or removed from the bales 14 and the thus conditioned bales can be quickly operatively coupled to the chain 34 or the terminal portions of the cables 42, whichever the case may be. There is thus eliminated the need for manually handling the relatively heavy bales as in present practices. After the bales have been lifted from the hold to the dock platform or any other suitable place of deposit, the screw hooks 26 may be selectively removed or retained with the bale depending upon the extent to which such retention might enhance subsequent handling of the bales. For example, retention may be desired for subsequent transfer of the individual bales by an endless conveyor, for example, in a rubber mill or like rubber processing installations. Whenever removed from the bales, the screw hooks 26 can be returned to the dock platform for subsequent return to the ship hold for reuse with other bales.

It will be understood that although the screw hooks 26 are formed with hook ends, a closed ring or loop could also be provided in which event the chain or other attaching means could be formed with hook ends or could be threaded through the ring for attaching the bale thereto. It will also be understood that although the disclosed system finds particularly advantageous use with rubber bales, other materials similarly capable of removably receiving the screw hooks could be handled as well in accordance with the present invention.

Other modes of applying the principle of the invention may be employed, change being made as regards the details described, provided the features stated in any of the following claims or the equivalent of such be employed.

I therefore particularly point out and distinctly claim as my invention:

1. A method of handling bales of rubber or similar material for transferring the same from the hold of a ship to a place of deposit comprising the steps of firmly embedding into each of a plurality of such bales a screw hook, the hook end of which is exposed exteriorly of the bale, to permit lifting of the bale, lowering lifting means into the hold of the ship, engaging the hook of each bale with said lifting means, simultaneously lifting said bales from the hold of the ship by said lifting means onto said place of deposit, and removing said screw hooks from said bales.

2. A method of handling bales of rubber or similar material which comprises inserting a metal screw into each such bale with rotary power means, attaching such screws to lifting and transporting means, energizing the latter to lift and transport such bales as a group, detaching such screws from such lifting means, thereafter sequentially individually transporting such bales by engagement with such screws, and removing such screws for reuse.

3. The method of claim 2, wherein such screws are removably hooked to such lifting and transporting means.

4. A method of handling bales or rubber or similar material for transferring tthe same from the hold of a ship to a place of deposit comprising the steps of firmly embedding a member into each of a plurality of such bales, an end of such member being exposed exteriorly of the bale to permit lifting of the same, lowering lifting means into the hold of the ship, engaging the exposed end of each member with said lifting means, simultaneously lifting said bales from the hold of the shiip by said lifting means onto said place of deposit, and removing said members from said bales.

5. A bale lifting system for moving at one time a plurality of bales of rubber or like material from the hold of a ship, comprising power means for partially embedding and removing a screw hook into each such bale, said screw hook including a helical screw-like bottom portion firmly embedded in such bale and a hook end exposed exteriorly of such bale to permit lifting of the same, power lifting means for lifting and transporting said bales, and means operatively connected to said power lifting means engageable with the plurality of hooks exposed exteriorly of said bales for simultaneously lifting said bales by said power lifting means from said hold.

References Cited by the Examiner

UNITED STATES PATENTS

| | | | |
|---|---|---|---|
| 39,128 | 7/1863 | Dick | 294—121 |
| 1,587,259 | 6/1926 | Wadd et al. | 214—152 |
| 2,205,550 | 6/1940 | Wehr | 294—121 |
| 2,448,373 | 8/1948 | Hurst | 214—15 |

GERALD M. FORLENZA, *Primary Examiner.*

ROBERT G. SHERIDAN, *Examiner.*